May 27, 1924.
W. KUNZE
METHOD AND MEANS FOR DETERMINING VELOCITY
Filed Aug. 14, 1920
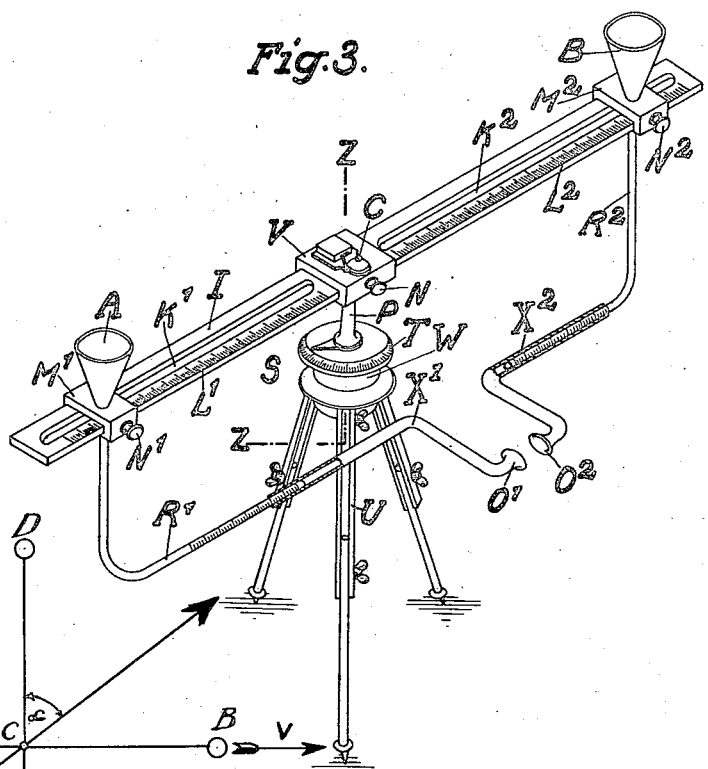
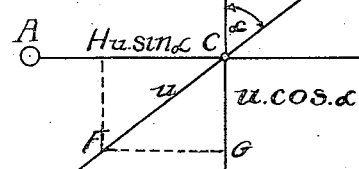
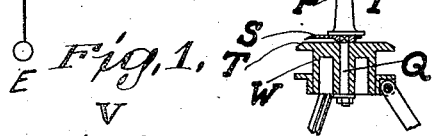
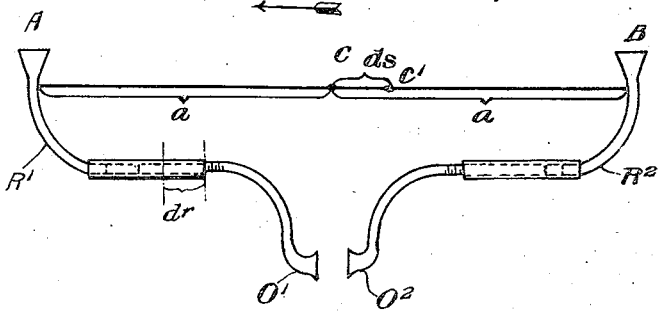
Inventor:
Willy Kunze.
by Herbert G. Ry
his attorney.

Patented May 27, 1924.

1,495,852

UNITED STATES PATENT OFFICE.

WILLY KUNZE, OF BREMEN, GERMANY.

METHOD AND MEANS FOR DETERMINING VELOCITY.

Application filed August 14, 1920. Serial No. 403,620.

*To all whom it may concern:*

Be it known that I, WILLY KUNZE, a citizen of the German Republic, and a resident of Bremen, Germany, have invented certain new and useful Improvements in a Method and Means for Determining Velocity, of which the following is a specification.

It is known, that sound waves, which arrive at the same time at both ears of the observer, produce the impression, that the source of sound lines in the median plane. If the sound waves arrive earlier at one ear than at the other ear, in accordance with the magnitude of the difference of time, with which the sound waves arrive at both ears of the observer, the source of sound will be assumed to be located more or less laterally, that is to say, on the side of that ear, which is reached first.

On the other hand, when sound waves produce a lateral impression of direction, it can be assumed, that a certain difference of time exists between the arrival of the sound waves at the two ears of the observer. The magnitude of the difference of time can be computed directly from the largeness of the lateral impression. The impression of the observer that the source of sound is located more or less laterally thus gives directly the magnitude of differences of time of the impression of direction. The periods of time in question lie approximately between 0.00001 and 0.0006 of a second. Men accordingly have in their auditory organs a sense for determining extremely short periods of time. This comprehension is utilized in the present invention.

According to the invention two sound receivers (for instance funnels, which are connected by tubes of equal length with the ears; microphones or the like) are arranged in a certain, unchangeable distance from each other. If in the center between the two sound receivers or in general in the normal plane, which has been erected in the center of the line of connection of the two receivers, sound waves are produced, the latter will arrive at the same time at the sound receivers and accordingly also at the same time at the ears and thereby produce the impression, that the source of sound lies in the median plane, that is to say either in the front or rear direction of the same. It is assumed in this connection, that the sound guiding or conducting medium is in a position of rest relatively to the receiver system. If however said medium has a certain velocity in the direction of the line of connection of both receivers, to the velocity of sound in the direction towards the one receiver the velocity of flow of the medium is added, while said velocity of flow is to be subtracted in the direction towards the other receiver. The sound produced in the center of the line of connection of both receivers accordingly will arrive earlier at the one ear than at the other one and will cause the impression, that the source of sound is located laterally. By extending or shortening in a manner known per se the tubing leading from the one receiver to the ear or by sliding or displacing the one receiver towards the source of sound, the lateral impression can be converted to the central impression and from the largeness of said extension or shortening the difference of time, with which the sound arrives at both ears can be computed. This conversion of the lateral impression of direction to the central impression can be effected also thereby, that the source of sound itself is caused to approach that receiver, at which the sound arrived later than at the other one. From this displacement then the original difference of time can be ascertained and from the thus determined time now the velocity of the sound conducting medium is to be computed. For this purpose the arrangement, illustrated in the accompanying drawings is provided.

In said drawings:

Fig. 1 shows in a diagrammatical manner the two sound receivers with the base arm connecting the same and the sound tubes leading to the ears of the observer.

Fig. 2 represents also in a diagrammatical manner the measuring of the velocity of the sound, when besides the receiver system also the medium (for instance air) is in motion and when the direction of the movement of the medium forms any desirable angle with the direction of travel of the receiver system.

Fig. 3 shows a complete apparatus for determining the velocity of sound and

Fig. 4 is a vertical section taken on line Z—Z of Fig. 3.

In Fig. 1 of the drawings A and B indicate two sound receivers, for instance two funnels, which are connected by means of the tubes $R^1$ and $R^2$, having equal length and being provided with hose extensions, with the ear pieces $O^1$ and $O^2$ of the observer. The distance between A and B is assumed to be twice $a$. The source of sound is present in the center between A and B. The medium (air) may have the velocity $v$ in the direction from B towards A (direction of the arrow). The velocity of the sound in the certain medium may be indicated by $c$. The sound then, in order to proceed from C to A consumes the time $$t_1 = \frac{a}{c+v}$$

and in order to proceed to B the time $$t_2 = \frac{a}{c-v}.$$

The difference of time accordingly is $$t_1 - t_2 = \frac{2av}{c^2 - v^2}.$$

For the amount of this difference of time the sound arrives earlier at A than at B and accordingly also earlier at $O_1$ than at $O_2$. In consequence thereof the impression is produced, that the source of sound is located as displaced laterally towards A. In order to balance the difference of time and to convert the lateral impression into the central impression, it is necessary, to either extend the tube $R^1$, for a certain distance $d\ r$ or to shorten $R^2$ or to displace or slide the source of sound C itself for the distance $d\ s$ towards B. The distance $d\ r$ or $d\ s$ respectively can be measured and the velocity of flow of the medium can be computed. If namely by the displacement of the source of sound a central impression is produced, this will indicate, that the periods of time towards both directions from the source of sound to the ears are equal, that is to say $$\frac{a+ds}{c+v} = \frac{a-ds}{c-v}.$$

Therefrom results the velocity $$v = \frac{cds}{a}.$$

When the base A B does not coincide with the direction of travel of the medium, but forms with said direction the angle β, only a component of said velocity acts upon the sound waves in the direction towards the receivers and in the above equation $v$ must be substituted by $v \cos.$ β.

Apparently it must be immaterial for the employed effect of direction, whether the system of source of sound and receivers is in a position of rest in a medium traveling relatively to the earth, or whether the medium is in a position of rest and the system is traveling. The two receiver funnels A B for instance may be arranged together with the source of sound C upon a ship, traveling with the velocity $v$ relatively to the earth, in the longitudinal direction of said ship. The sound conducting medium (the air or the water) is in a position of rest relatively to the earth. Then the sound produced in the center C of the base A, B will arrive at different times at A and B, as the one receiver moves together with the ship towards the sound, while the other one moves away from the sound. The arising difference of time can be perceived again as impression of direction and can then be converted to central impression in the above described manner, whereupon the velocity of the vehicle relativity to the earth can be determined.

The case is more complicated when the medium too is traveling. The medium may travel in opposition to the direction of movement of the receiver system with the velocity $w$, while the vehicle may have the velocity $v$. Then in the direction towards the one receiver to the velocity of the sound besides the additional velocity $v$, on account of the velocity of the vehicle, the velocity $w$ of the medium is added, while in the direction towards the other receiver both factors are to be subtracted. The displacement $d\ s$ necessary for producing the central impression accordingly must be made correspondingly larger.

When the medium travels in the direction of the vehicle, that means in the direction of the arrow shown in Fig. 1, only the sign of $w$ needs to be reversed. If the direction of travel of the medium forms any angle with the direction of movement of the vehicle, for the purpose of ascertaining the velocity of the vehicle in the flowing medium, two sound receiving systems are arranged relatively to each other in such a manner, that at the one system only the velocity of the medium and at the other system the velocities of travel of the vehicle and of the medium can produce an impression of direction, so that from the measurements made with both systems each velocity per se can be ascertained.

In order to more clearly explain the foregoing description reference is taken to Fig. 2, in which the two receivers are indicated by A and B, which are connected with each other by the base, which latter is located in the direction of travel. D and E are two receivers, the base of which is arranged vertically to the base A, B. The sound waves emanating from C always reach the receivers D E at the same time, when the medium is in a position of rest, it being immaterial, whether the vehicle is in position of rest or is moving. The travelling velocity $v$ acts upon all four receivers A, B and D, E. With the use of the receivers A B a lateral impression of direction is caused, whereas with the receivers D E always a central impression arises.

When however also the medium, for instance the air, is traveling and is eventually flowing in the direction F, C with the velocity F C=$u$, using the receivers of base D E an impression of direction will arise, which can be accounted for only by the flow of the medium.

If the direction of flow is known and is given by the angle $\alpha$ with aid of the base D E the component G C=$u$ cos. $\alpha$ and in consequence thereof the velocity of the medium itself can be determined. At the base A B besides the velocity of travel the component H C=$u$ sin. $\alpha$ of the velocity of the medium is effective. Accordingly when measuring with the base A B the velocity $v+u$ sin. $\alpha$ is obtained, and as $u$ sin. $\alpha$ is known from the measurement with D E, the velocity of travel relatively to the earth can be computed.

The determination of the velocity of travel $v$ can be effected also with only one receiver base A B by turning the base A B for an angle of 90°, so that it stands vertically to the direction of travel.

For performing the above described method in practice, various arrangements may be employed. The receivers A B can be rigidly mounted upon a common carrier I, however they can be also slidably and adjustably arranged upon said carrier. In the latter case the funnels or receivers A, B are provided with sliding-members $M^1$, $M^2$, which can slide upon the graduated scales $L^1$, $L^2$ and can be adjusted by means of the set-screw $N^1$, $N^2$. At this displacement of the sliding members $M^1$, $M^2$ the tubes $R^1$, $R^2$ slide in the slots $K^1$, $K^2$ of the carrier I. The scales $L^1$, $L^2$ are suitably graduated in velocity units.

Upon the carrier I a source of sound, consisting of a rapping device or a ringing apparatus C, is arranged, which is mounted upon a sliding-member V. Said sliding-member V is slidably arranged upon the carrier I and can be fixed in position by means of the set-screw N. The carrier I rests upon a post P and is rigidly secured to the same; said post terminating in a pin Q, to which the indicator S is connected. The pin Q is rotatably mounted in a connecting member W, receiving the legs U of the post and being provided also with a scale T, graduated in angular units.

The tubes $R^1$ and $R^2$ also are each provided with a graduation and have slidable bearing tubes, which lead to the hearing trumpets $O^1$ and $O^2$.

From Fig. 3 it can be seen, that the distance between the two funnels A, B that is the base 2 a can be enlarged or reduced, that is to say enlarged, when slight velocities are to be measured, however reduced, when great velocities are to be measured. When sound funnels are employed in the air, they must be placed in such a manner, that the medium can not flow into the same. When measuring with water, as medium, submarine sound receivers must be employed. If microphones are used as receivers, the observer can effect the conversion of the lateral impression into the central impression by causing the telephones, which may slide in tubes, to approach each other or to remove from each other. The receivers can also be fixedly arranged on the vehicle without special carriers. In this case four receivers are necessary, that is two for a longitudinal base and two for a cross base.

For performing this novel measuring method finally on the vehicles some already existing predominant source of sound, for instance in flying machines the exhaust-device may be employed.

The range of employment of this novel method is very far reaching. For instance it may serve to measure or determine the velocities of flowing media, especially wind-velocities. Further it may be used, to determine the velocity of travel relatively to the earth of water-, air- or land-vehicles, irrespectively whether the medium is in a position of rest or is moving.

Having thus particularly described the nature of said invention, what I claim as new and desire to secure by Letters Patent of the United States is:

1. Method for determining velocity which consists in taking up the sound of a sounding body suitably placed relative to receivers on the base line thereof by means of these receivers conducting said sound to the ears of the observer by separate tubes and causing the lateral impression in the case of motion to be reduced to a central impression by varying the length of the path of sound from the source of sound to the ears of the observer, the largeness of reduction giving the amount of velocity.

2. Method for determining velocity which consists in taking up the sound of a sounding body suitably placed relative to receivers on the base line thereof by these receivers, conducting said sound to the ears of the observer by separate tubes and causing the lateral impression in the case of motion to be reduced to a central impression by altering the lengths of the separate tubes, the largeness of reduction giving the amount of velocity.

3. Method for determining velocity which consists in taking up the sound of a sounding body suitably placed relative to receivers on the base line thereof by means of these receivers conducting said sound to the ears of the observer by separate tubes and causing the lateral impression in the case of motion to be reduced to a central impression by shifting the source of sound the largeness of reduction giving the amount of velocity.

4. A device for determining velocity comprising in combination a sounding body, receivers adapted to take up said sound, separate tubes connecting said receivers with the ears of the observer and means for varying the length of the path of sound from the source of sound to the ears of the observer.

5. A device for determining velocity comprising in combination a sounding body two receivers adapted to take up said sound, separate tubes connecting said receivers with the ears of the observer said tubes being variable in length.

6. A device for determining velocity comprising in combination a sounding body, two receivers adapted to take up said sound, separate tubes connecting said receivers with the ears of the observer, said source of sound being movable relatively to the receivers.

7. A device for determining velocity comprising in combination a sounding body, two receivers adapted to take up said sound, separate tubes connecting said receivers with the ears of the observer, said receivers being movable relatively to the source of sound.

8. A device for determining velocity comprising in combination a sounding body, two receivers adapted to take up said sound by separate tubes connecting said receivers with the ears of the observer, said receivers being mounted on an arm rotatable in a horizontal plan.

9. A device for determining velocity comprising in combination a sounding body, four receivers adapted to take up said sound separate tubes connecting said receivers to the ears of the observer, the base of two of said receivers being arranged perpendicularly to the base of the other receivers.

In testimony whereof I affix my signature.

Dr. WILLY KUNZE.